United States Patent
Fetzer

[11] 3,731,768
[45] May 8, 1973

[54] EXTERNAL SHOE BRAKE PARTICULARLY FOR SPINNING AND TWISTING SPINDLES

[75] Inventor: Gustav Fetzer, 7344 Gingen, Germany

[73] Assignee: Firma Zinser-Textilmaschinen Gesellschaft mit beschrankter Haftung, Postfach, Ebersbach, Germany

[22] Filed: Apr. 13, 1971

[21] Appl. No.: 133,559

[30] Foreign Application Priority Data

Dec. 5, 1970 Germany..................G 70 44 944.4

[52] U.S. Cl................................................188/75
[51] Int. Cl..............................................F16d 49/16
[58] Field of Search..................74/104, 107; 188/75

[56] References Cited

UNITED STATES PATENTS

| 297,089 | 4/1884 | Rutherford | 188/75 X |
| 2,660,395 | 11/1953 | Mair et al. | 74/107 X |
| 1,778,570 | 10/1930 | Soresi | 188/75 X |
| 2,333,047 | 10/1943 | Schlums | 188/75 X |
| 3,297,112 | 1/1967 | Mulholland et al. | 188/75 |
| 3,292,742 | 12/1966 | Thomas | 188/75 X |

FOREIGN PATENTS OR APPLICATIONS 1,213,479  8/1958  France ...........................188/75

Primary Examiner—Edward A. Sroka
Assistant Examiner—W. Scott Carson
Attorney—Edwin E. Greigg

[57] ABSTRACT

In a friction brake that includes a manually operable pivotable brake lever to draw towards one another two brake shoes for engaging an interposed spindle to be braked, the work face of the brake lever engaging one of the brake shoes has a contour which has a flat portion and a convex portion spaced therefrom. If the lever is moved in one direction from its normal (released) position, a cooperation between said flat portion and a brake shoe will maintain the lever in its braking position even without continuing application of manual force. If the lever is moved in another direction from its normal position, a cooperation between said convex portion and said brake shoe will continuously urge said lever from its braking position into its normal position.

10 Claims, 2 Drawing Figures

Patented May 8, 1973

3,731,768

INVENTOR.
Gustav Fetzer
BY
Edwin E. Greigg ived into a conventional manner

EXTERNAL SHOE BRAKE PARTICULARLY FOR SPINNING AND TWISTING SPINDLES

BACKGROUND OF THE INVENTION

This invention relates to an external shoe brake particularly for spinning and twisting spindles and is of the type which has two brake shoes movable within limits and which, with the aid of a swingable lever, may be brought into a braking position against the force of spring means and which, upon swinging the lever in an opposite direction from said braking position, return into their released position.

Brake structures of the aforeoutlined type are associated with individual spindles in textile machines for the purpose of immobilizing by friction the associated spindle to permit maintenance, repair, or other work (i.e. upon yarn breakage) to be performed while other, unaffected spindles continue their rotation. The lever causing the immobilization of the spindle may be actuated by the operator's hand or knee.

It is a desideratum that the operating person be able to actuate the lever selectively in such a manner that either there appears a braking action which lasts only as long as the operating person holds the lever in the braking position and as soon as the lever is released, the brake returns into its released position, or there is obtained a braking action which continues even after the operating person removes his hand or knee from the lever. In the latter case the operating person then has to exert a force to the lever to move it into the released position if the braking action is to be terminated.

OBJECT AND SUMMARY OF THE INVENTION

It is an object of the invention to provide an improved external shoe brake of simple and operationally safe structure which is adjustable by simple means and in which the brake lever may selectively be brought into either a "stable" braking position which is maintained without continuous force exerted on the brake lever, or into an "unstable" braking position from which it is released as soon as the force exerted on the operating lever is removed.

Briefly stated, according to the invention, in an external shoe brake of the aforenoted type, the first brake shoe supports a tie rod mechanism which carries the operating lever. The latter has a contour face which cooperates with an external surface of the second brake shoe for pressing both brake shoes against a rotationally symmetrical braking face of the spindle. The contour face of the lever is designed in such a manner that if the lever is swung from its normal position in which the brake shoes are disengaged from the spindle, in one direction, it is, by itself, retained in the braking position, whereas if swung in the other direction, it will stay in the braking position only as long as an external force is exerted to the lever in that direction.

The invention will be better understood, as well as further objects and advantages will become more apparent, from the ensuing detailed specification of a preferred, although exemplary, embodiment of the invention taken in conjunction with the drawing.

DESCRIPTION OF THE PREFERRED EMBODIMENT

Figure 1:
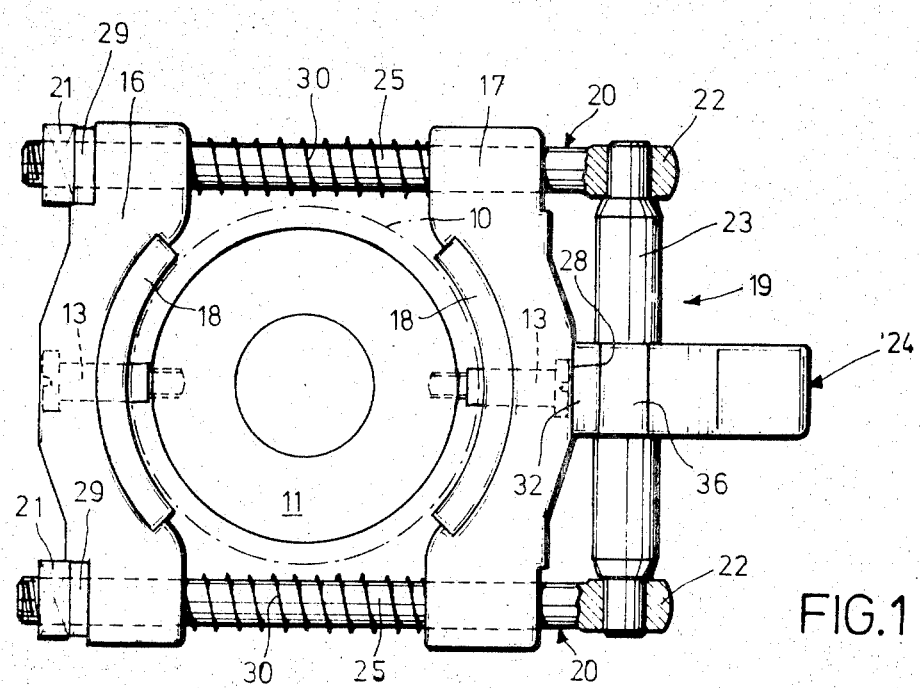
FIG. 1 is a partially sectional top plan view of the brake according to the preferred embodiment.

Turning now to FIG. 1, there is shown in dash-dot lines the circumference of the rotationally symmetrical friction face 10 of a spindle with which the brake now to be described is associated. The friction face 10 may be provided on the spindle in a conventional manner and is in general formed as the outer face of a bell-shaped extension of the spindle whorl. Such a friction face arrangement is well known and is therefore not dealt with in more detail.

Figure 2:
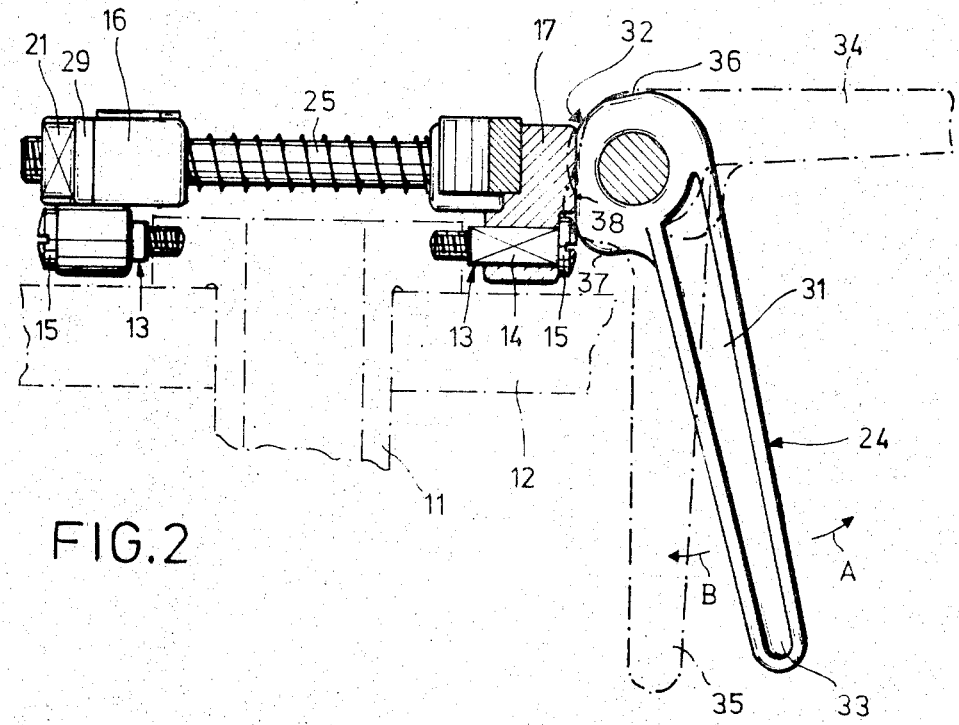
FIG. 2 is a partially sectional side elevational view of the same embodiment.

The bearing sleeve 11 supporting the spindle is affixed to a spindle rail 12 (FIG. 2). In the flange of the bearing sleeve 11 engaging the ring rail 12 there are threadedly tightened at diametrically opposed locations two bearing pins 13 which are in axial alignment with respect to one another. Each bearing pin 13 comprises a prismatic shank 14 serving for the support and linear guidance of the first and second brake shoes 16 and 17, respectively, and a head 15 which serves as an abutment for determining the outermost position of the associated brake shoe.

The brake shoes, 16, 17 are mirror images of one another and comprise brake linings 18 at their faces adjacent the friction face 10 of the spindle. In addition to the two brake shoes 16, 17, the external shoe brake further comprises a tie rod assembly 19 which has two parallel linear bars 20 each carrying at one end a threadedly engaged nut 21. The bars 20 are provided at their other ends with eyes 22 which have aligned bores for supporting a transverse connecting rod 23. The latter is rotatable, but is prevented from axial displacement. To the middle of the connecting rod 23 there is affixed a lever 24 which serves for manually operating the brake. The cylindrical shanks 25 of the two bars 20 are disposed at a distance from the friction face 10 disposed therebetween and are longitudinally displaceably supported in cylindrical bearing bores of the two brake shoes.

The nuts 21 serve to displace the first brake shoe 16 towards the friction face 10 and further serve for setting the magnitude of the braking force in the stable position 34 of the lever 24. Between each nut 21 and an adjacent portion of the first brake shoe 16 there is provided an elastic disc 29. Between the two brake shoes 16 and 17 each bar 20 is surrounded by a biased compression spring 30 which continuously urges the two brake shoes 16, 17 into positions in which they are disengaged from the brake face 10 of the spindle. The outermost positions of the brake shoes 16, 17 are determined by the heads 15 of the two bearing pins 13 serving as abutments. By rotating the bearing pins 13, the axial position of the abutments 15 may be set in a desired manner.

The lever 24 comprises a handle portion 31 and is, at its circumference adjacent the connecting rod 23, provided with a contour face 32 which cooperates with a central, planar face portion 28 of the outer face of the second brake shoe 17. The contour face 32 is designed in such a manner that the lever 24, when swung in the direction of arrow A from its normal position 33 shown in full lines in which the brake shoes 16, 17 are disengaged from the brake face 10 of the spindle, maintains itself in the dash-dotted braking position 34, whereas if the lever is swung from its normal position in the other direction as indicated by arrow B, the lever will not be maintained by itself in the braking position. The lever has to be maintained in this last-named braking position which is shown in dash-dot lines and indicated at 35, by continuously applying a manual force thereto. As soon as said force is removed, the lever returns from the braking position 35 to its normal, released position 33.

The stable or self-maintaining position of lever 24 in the braking position 34 is achieved by means of a flattened zone 36 which is part of the contour face 32 and which is disposed substantially parallel to the pivotal axis of the lever 24. The flattened zone 36 lies flat against the planar outer face 28 of the second brake shoe 17 in the braking position 34. Thus, in this position, the lever may be released without thereby changing the braking position. In order to release the brake when in braking position 34, the lever 24 has to be manually brought back into its normal or released position 33.

By virtue of the elastic disc 29, the assembly comprising the brake shoes 16, 17 and the tie rod assembly 19, has a small elasticity, so that when the brake shoes 16, 17 lie against the friction face 10 of the spindle, the lever 24 may be brought into its stable braking position 34 under the elastic deformation of the two discs 29. These elastic intermediate members 29 diminish the operating force necessary for moving the lever to and from the self-maintaining position 34 and, accordingly, also decrease the magnitude of the maximum pressure force exerted by the brake shoes on the friction face 10 of the spindle during the movement of the lever 24 into the position 34. During the last-named movement there is encountered an unstable dead center in which the brake shoes are compressed by the lever to a greater extent than when in their over-the-center stable position 34. The elastic discs facilitate the overcoming of the unstable dead center and also prevent an excessive load on the brake.

The unstable braking position 35 of the brake lever 24 is achieved by means of a convex curved zone 37 which is part of the contour face 32. The convex zone 37 is so situated with respect to the pivotal axis of lever 24 that in position 35 — i.e. when the convex zone 37 engages the planar portion 28 — the springs 30 and the resilient discs 29 apply a torque to lever 24 in the direction of the inoperative position 33. Thus, an external (e.g. manual) force is needed to overcome said torque for maintaining the lever 24 in its unstable braking position 35.

As it may be seen in FIG. 2, the contour face 32 of the lever 24 has, in addition to the flattened zone 36 and the convex zone 37, a further flattened zone 38 which is parallel to the pivotal axis of the lever 24 and which, dependent upon the setting of the nuts 21, lies or may lie against the planar outer face 28 of the second brake shoe 17 in the normal or released position 33 of the lever 24. In this manner it is achieved that the normal position 33 is also a stable position of the lever 24.

Since the tie rod assembly 19, as well as the lever 24, is carried exclusively by the two brake shoes 16, 17, there appears a floating support of the brake assembly at all times on the bearing pins 13 when the lever 24 is swung into a position in which at least one of the brake shoes no longer lies against its associated abutment head 15. In such an event the brake assembly as a whole may be shifted on the bearing pins 13 to and fro to an extent determined by the prevailing clearance. In this manner a self-centering of the brake occurs, so that the two brake shoes 16, 17 are, during braking, automatically pressed against the friction face 10 of the spindle with forces of identical magnitude. There is thus obtained a uniform and secure braking effect which does not cause stresses in the spindle support.

In the embodiment shown and described, the pivotal axis of the lever is horizontal which is particularly advantageous for a manual operation. If desired, however, the lever 24 — with suitable means for connecting it to the transversal rod 23 — may be arranged to swing about a vertical axis. Such arrangement is particularly advantageous for an operation by knee.

It is an advantage of the brake according to the invention that the braking force applied in the self-maintaining position 34 may be set or adjusted in a simple manner by means of the nuts 21. It is to be understood that instead of nuts 21, other means may be used for adjusting the brake force which may be associated, for example with the tie rod assembly 19.

In the above-described preferred embodiment the movement of the brake shoes is linear. It is to be understood, however, that the brake shoes may be so designed that they are pivotally held at one end and cooperate with a tie rod assembly at the other end. A floating support of the type referred to hereinabove is possible by affixing the pivot pins of the brake shoes to a movable member, the motion of which is limited to a linear displacement tangentially with respect to the spindle.

That which is claimed is:

1. In a brake for frictionally engaging a rotationally symmetrical face of a rotary member, the improvement comprising
    A. a first brake shoe movable towards and away from said rotary member,
    B. a second brake shoe movable towards and away from said rotary member and having an outer flat face portion,
    C. a tie rod assembly connecting said first and second brake shoes to one another and including
        1. two bars arranged symmetrically with respect to an axial plane of said rotary member,
        2. a transversal rod connecting said bars with one another,
    D. a brake lever pivotally held on said transversal rod adjacent said outer flat face portion of said second brake shoe; said brake lever adapted to assume a first position in which said brake is in a released condition and arbitrarily chosen second and third positions in which said brake is in an actuated position; said brake lever having
        1. a handle portion for receiving an external force applying a torque to said brake lever,
        2. a contour face for engaging said outer flat face portion of said second brake shoe to cause displacement of said brake shoes with respect to one another and said rotary member; said contour face having a. a first zone engaging said outer flat face portion of said second brake shoe in said second position; the engagement between said first zone and said outer flat face portion maintaining said brake in said second position in the absence of an external force and b. a second zone engaging said outer flat face portion of said second brake shoe in said third position; the engagement between said second zone and said outer flat face portion causing said brake lever to move into said first position in the absence of an external force and E. two aligned stationary bearing pins disposed diametrically opposite with respect to said rotary member, said bearing pins supporting and guiding said brake shoes in their movement in a linear path.

2. An improvement as defined in claim 1, wherein said first zone of said contour face is flat and having a plane substantially parallel to the pivotal axis of said brake lever.

3. An improvement as defined in claim 1, including elastic means disposed between said tie rod assembly and one of said brake shoes; said elastic means yields by means of elastic deformation when said brake shoes engage said rotary member and said brake lever is moved into said second position.

4. An improvement as defined in claim 3, wherein said elastic means is constituted by at least one elastic disc disposed between at least one of said bars and said first brake shoe.

5. An improvement as defined in claim 1, wherein each brake shoe includes two throughgoing guide bores; each bar passes through one guide bore in the first brake shoe and through one guide bore in the second brake shoe.

6. An improvement as defined in claim 1, including at least one compression spring disposed between said brake shoes and being in engagement therewith; said compression spring urges said brake shoes away from one another and from said rotary member.

7. An improvement as defined in claim 1, wherein said second zone of said contour face is outwardly convex.

8. An improvement as defined in claim 1, wherein said contour face includes a third zone of flat configuration having a plane substantially parallel to the pivotal axis of said brake lever and adapted to engage said outer flat face portion of said second brake shoe in said first position of said brake lever.

9. An improvement as defined in claim 1, including means for adjusting the braking force of said brake exerted to said rotary member in said second position of said brake lever.

10. In a brake for frictionally engaging a rotationally symmetrical face of a rotary member, the improvement comprising A. a first brake shoe movable towards and away from said rotary member, B. a second brake shoe movable towards and away from said rotary member and having an outer flat face portion, C. a tie rod assembly connecting said first and second brake shoes to one another, D. a brake lever pivotally held on said tie rod assembly adjacent said outer flat face portion of said second brake shoe; said brake lever adapted to assume a first position in which said brake is in a released condition and arbitrarily chosen second and third positions in which said brake is in an actuated position; said brake lever having 1. a handle portion for receiving an external force applying a torque to said brake lever, 2. a contour face for engaging said outer flat face portion of said second brake shoe to cause displacement of said brake shoes with respect to one another and said rotary member; said contour face having a. a first zone engaging said outer flat face portion of said second brake shoe in said second position; the engagement between said first zone and said outer flat face portion maintaining said brake in said second position in the absence of an external force, b. a second zone engaging said outer flat face portion of said second brake shoe in said third position; the engagement between said second zone and said outer flat face portion causing said brake lever to move into said first position in the absence of an external force, E. a bearing member for supporting said rotary member, F. at least two bearing pins affixed to said bearing member for supporting and guiding said brake shoes in their radial displacement with respect to said rotary member and G. an abutment forming part of each bearing pin to determine the outermost location of said brake shoes in the first position of said brake lever.

* * * * *